July 20, 1926.
L. M. BUSSEY
METAL ANIMAL PEN
Filed Feb. 13, 1924
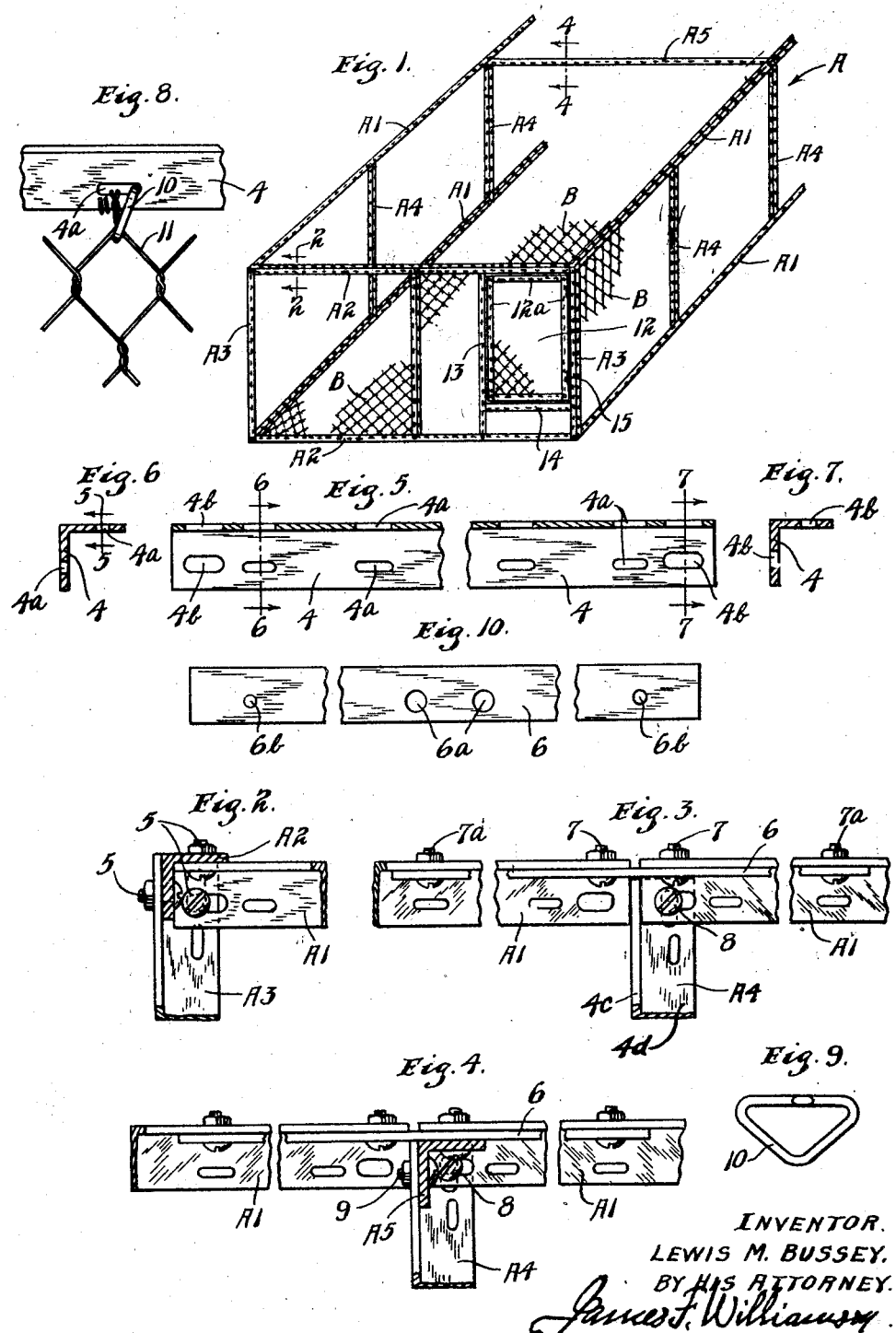
INVENTOR.
LEWIS M. BUSSEY.
BY HIS ATTORNEY.
James F. Williamsey Patented July 20, 1926.

1,593,015

UNITED STATES PATENT OFFICE.

LEWIS M. BUSSEY, OF MINNEAPOLIS, MINNESOTA, ASSIGNOR TO CROWN IRON WORKS COMPANY, OF MINNEAPOLIS, MINNESOTA, A CORPORATION OF MINNESOTA.

METAL ANIMAL PEN.

Application filed February 13, 1924. Serial No. 692,466.

This invention relates to a pen or cage and particularly to such a device adapted for animals. While the cage of this invention has high utility as a dog cage or for various other animals, it is particularly designed for use as a fox pen. The raising of foxes has now reached large proportions in this country and there is a demand for a simple, inexpensive and sanitary pen which can be quickly assembled or disassembled when desired.

It is an object of this invention to provide a simple and inexpensive metal pen having few parts, which can easily and quickly be set up in very firm and rigid relation to form the pen and which can be quickly disassembled or dismantled.

It is more specifically an object of this invention to provide such a pen formed of bars having flanges disposed in planes at right angles to each other, said bars forming the edges or corners of a right angular parallelopiped and constituting the frame of the cage, reticulate metal being secured to and extended between said bars.

It is a further object of the invention to provide such a pen formed of similar angle bars, which bars have longitudinally alined and spaced apertures in both flanges throughout their length and which also have longitudinal elongated slots adjacent their ends in both flanges thereof, the latter being adapted to receive securing bolts or other securing means.

It is still a further object of the invention to arrange said bars and securing means in a novel manner to form a firm and efficient structure.

These and other objects and advantages of the invention will be fully set forth in the following description made in connection with the accompanying drawings, in which like reference characters refer to the same parts throughout the different views, and in which—

Fig. 1 is a perspective of a portion of the pen embodying the present invention;

Fig. 2 is a vertical section taken on the line 2—2 of Fig. 1, as indicated by the arrows;

Fig. 3 is a view in side elevation as seen from the right of Fig. 2;

Fig. 4 is a vertical section taken on the line 4—4 of Fig. 1, as indicated by the arrows;

Fig. 5 is a vertical section on the line 5—5 of Fig. 6, as indicated by the arrows;

Fig. 6 is a vertical section taken on the line 6—6 of Fig. 5, as indicated by the arrows;

Fig. 7 is a vertical section taken on the line 7—7 of Fig. 5, as indicated by the arrows;

Fig. 8 is a partial view in side elevation illustrating the attachment of the screen to the angle bars;

Fig. 9 is a view in side elevation of a clip used; and

Fig. 10 is a view in side elevation of a connecting bar used; Figs. 2 to 8 being shown on a larger scale than Fig. 1.

Referring to the drawings, in Fig. 1 is shown a portion of a pen embodying the present invention. Said pen is rectangular or is in the form of a right angular parallelopiped and comprises an open frame designated, generally, as A, together with a screen covering B. The frame A is composed of top and bottom side members $A^1$, top and bottom end members $A^2$ and vertical corner members $A^3$ as well as intermediate vertical members $A^4$ and intermediate horizontal members $A^5$. While other suitable metal members might be used, preferably, and in the embodiment of the invention illustrated, the frame members $A^1$ to $A^5$ are formed of angle bars shown as 4 in Figs. 5, 6 and 7. These angle members, preferably, are made of one length and each has a series of longitudinally disposed spaced alined slots $4^a$ formed therein through both flanges and each bar further has somewhat larger longitudinally extending and alined slots $4^b$ therethrough in each flange adjacent its end. When the bars are assembled and connected to form the frame A, one bar extends vertically at the corners of the frame, as shown in Fig. 2. Another of the bars 4 is then placed with its ends abutting one of the flanges of the vertical bar and extending in a horizontal direction with its top substantially flush with the top of the vertical bar. One flange of this horizontal bar, designated as $A^2$ in Fig. 2, will be disposed horizontally while the other flange will be disposed vertically and the latter flange will lie flat against the other flange of the vertical bar designated $A^3$ in Fig. 2. The bar $A^2$ forms one of the horizontal end members of the frame A. Another of the bars 4 is then placed in position with its ends abutting the vertical flange of the member A² and its top horizontally disposed flange lying flat against the underside of the member A² and with its vertically disposed flange lying flat against one vertical flange of the vertical member A³. It will be noted from Figs. 1 and 2 that the angle bars 4 are disposed with their angles turned inwardly. With the angle bars arranged as shown in Fig. 2, the slots 4ᵇ are alined sufficiently to permit the insertion of the headed and nutted bolts 5 which extend through said slots 4ᵇ and securely fasten the angle bars together in rigid relation. It will be noted that the bolts 5 at the corners of the frame A, as shown in Fig. 2, extend at right angles to each other or in three different directions.

As the frame is made up of angle bars of equal length, intermediate vertical members A⁴ are required and the manner of connecting these members to the top and bottom horizontal members A¹ is shown in Fig. 3. The vertical member A⁴ is disposed with one flange 4ᶜ projecting inwardly of the frame and the adjacent horizontal members A¹ abut this flange at its opposite sides, one of said members A¹ lying flat against the other flange 4ᵈ. A flat bar 6, rectangular in cross section, as shown in Fig. 10 is used and this bar is placed beneath and flat against the horizontal flanges of members A¹. The bar 6 is provided adjacent its center with two holes 6ᵃ and these holes aline with the slots 4ᵇ in the angle bars. The two horizontal members A¹ are thus connected to the bar 6, and hence, to each other by the headed and nutted bolts 7 passing through the holes 6ᵃ and the slots 4ᵇ in the angle bars. The bar 6 is also provided adjacent its ends with two additional holes 6ᵇ adapted to aline with certain other apertures 4ᵃ in the angle bars and the bar 6 is thus further connected to the horizontal bars A¹ by headed and nutted bolts 7ᵃ passing through the holes 6ᵇ and holes 4ᵃ. Another headed and nutted bolt 8 passes through the slots 4ᵇ in the vertical member A⁴ and the horizontal member A¹ lies flat against one of the flanges thereof so that the horizontal members are thus connected rigidly to the intermediate vertical member. The intermediate vertical members A⁴ are thus rigidly and securely attached to the horizontal member A¹.

The intermediate horizontal members A⁵ are desirable at intervals and these members are disposed in alinement with the vertical members A⁴, the angle bars being connected as shown in Fig. 4. The vertical angle bar A⁴ and the horizontal angle bars A¹ as well as the connecting bar 6 are arranged as shown in Fig. 3 already described. The cross or intermediate horizontal member A⁵ is placed with its ends abutting the vertical flange of the angle bar A¹ that lies flat against one of the flanges of the vertical bar A⁴. This cross member A⁵ is, of course, horizontally disposed and has its top horizontally disposed flange lying flat against the underside of the bar 6 and has the outer side of its vertically disposed flange lying flat against one of the flanges of the vertical members A⁴. Said cross member A⁵ is connected to the vertical member A⁴ by a headed and nutted bolt 9 extending through the slots 4ᵇ in the ends of said bars. It will be seen that the slots 4ᵇ are of sufficient length to have the alined portions thereof receive the connecting bolts. The horizontal members A⁵ are thus rigidly and securely connected to the vertical members A⁴ and the horizontal side member A¹ so that the frame constitutes one rigid unit.

As stated, reticulate metal material of some kind is used as a covering or as forming the side, end, top and bottom panels of the frame. While any suitable reticulate metal could be used, it has been found that a high grade of ordinary chicken wire is quite suitable. This chicken wire is connected to the apertures or slots 4ᵃ in the bars 4, and while the same can be connected in any suitable manner, it has been found efficient to secure the netting as shown in Fig. 8. There is usually more or less of an end projecting on the wire and this is inserted through the opening 4ᵃ and turned about the edge of the bar. A ring 10 as shown in Fig. 9, is then clinched through the opening 4ᵃ and through one loop of the wire netting 11. These rings are made commercially for hog rings and are usually sold together with a clinching instrument therefor which can conveniently be used for clinching the clips through the wire netting 11 and the bars 4.

A door is desirable for the pen and such a door is shown in Fig. 1 as 12. This door is formed by providing an extra vertical member 13 formed of one of the angle bars 4 suitably spaced from a corner bar A³ and by providing a short angle bar 14. The frame bars 12ᵃ at the sides and ends of the door 12 can be connected by providing the same with the slots similar to the slots 4ᵇ and said bars will also be provided with intermediate apertures similar to the apertures 4ᵃ, to which wire netting will be connected. The door is hinged to one of the vertical members A² by the hinges 15 and may be provided with some suitable latch not shown.

In practice, the pen can be shipped with the frame members disassembled and packed together in a small space, together with the wire netting which will be supplied in the usual rolls. The frame can then be easily and quickly set up in the desired location and the screen material quickly placed thereon. By supplying the angle bars of similar lengths the frame can be extended as desired and as many sections added thereto as needed. The angle bars, of course, can be of any desired length, but in one popular commercial form these bars are six feet long.

From the above description it is seen that applicant has provided a very simple and efficient animal pen which is admirably suitable for a fox farm. The pen being entirely of metal is quite sanitary, strong and durable and capable of withstanding the weather. The angle bars are aluminized to prevent rusting and the wire netting, as is well known, is also coated with a nonrusting coating. The pen being made of standard metal material is produced quite inexpensively and its disassembling or collapsible feature renders it very convenient for shipping. The pen is being sold commercially in large numbers and its success and efficiency have been amply demonstrated in actual practice. While the form of pen illustrated is rectangular, it will be readily seen that similar pens could be made which would be in the form of a prism or would have a vertical cross section in the form of an equilateral triangle. Pens of polygonal shape in plan, such as five-sided, six-sided polygons could also be constructed with the angle bars of equal length.

It will, of course, be understood that various changes may be made in the form, details, arrangement and proportions of the parts without departing from the scope of applicant's invention, which, generally stated, consists in a device capable of carrying out the objects above set forth, such as shown and described and set forth in the appended claims.

What is claimed is:

1. An animal pen comprising a frame having vertical corner members and intermediate vertical members comprising angle bars, a horizontal bar adjacent the top of one of said vertical angle bars extending longitudinally of said frame having an end abutting one flange of said vertical bar and having one flange lying flat against the other flange of said vertical bar, a fastening means passing through and connecting the last two mentioned flanges, a second horizontal bar longitudinally alined with said first mentioned horizontal bar and having an end abutting the opposite side of the first mentioned flange of said vertical bar, a flat bar lying flat against the horizontal flanges of said horizontal bars and securing means passing through said flat bar and said horizontal bars securing the same together.

2. The structure set forth in claim 1, and a third horizontal bar extending horizontally substantially at right angles to said first mentioned horizontal bars having its end abutting the vertical flange of said first mentioned horizontal bar and having one flange lying flat against one flange of said vertical angle bar, and fastening means passing through the last two mentioned flanges securing the same together.

3. An animal pen comprising a frame having vertical corner members and intermediate vertical members comprising angle bars, a horizontal bar adjacent the top of one of said vertical angle bars having an end abutting one flange of said vertical bar and having one flange lying flat against the other flange of said vertical bar, a fastening means passing through and connecting the last two mentioned flanges, a second horizontal bar alined with said first mentioned horizontal bar and having an end abutting the opposite side of the first mentioned flange of said vertical bar, a flat bar lying flat against the horizontal flanges of said horizontal bars and securing means passing through said flat bar and said horizontal bars securing the same together, a third horizontal bar extending substantially at right angles to said first mentioned horizontal bars having an end abutting the vertical flange of said first mentioned horizontal bar and having one flange lying flat against one flange of said vertical angle bar, and fastening means passing through the last two mentioned flanges securing the same together, said third horizontal bar having its horizontal flange disposed beneath said flat bar and secured thereto and to the first mentioned horizontal bar by the fastening means which connects the said flat bar and said first mentioned horizontal bar.

In testimony whereof I affix my signature.

LEWIS M. BUSSEY.